United States Patent
Pyo et al.

(10) Patent No.: US 8,660,587 B2
(45) Date of Patent: Feb. 25, 2014

(54) METHOD FOR PROVIDING POSITION INFORMATION USING TIME PERIOD

(75) Inventors: Jong-sun Pyo, Gyeonggi-do (KR);
Seung-dong Yu, Gyeonggi-do (KR);
Woo-Yong Chang, Gyeonggi-do (KR);
Se-jun Park, Gyeonggi-do (KR);
Min-jeong Moon, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 36 days.

(21) Appl. No.: 12/943,702

(22) Filed: Nov. 10, 2010

(65) Prior Publication Data
US 2011/0117938 A1 May 19, 2011

(30) Foreign Application Priority Data
Nov. 13, 2009 (KR) .................. 10-2009-0109491

(51) Int. Cl.
*H04K 1/00* (2006.01)
(52) U.S. Cl.
USPC .......................................... 455/457; 380/255
(58) Field of Classification Search
USPC ............ 455/456.1–456.6, 457; 380/247, 248, 380/255; 726/10
See application file for complete search history.

(56) References Cited

U.S. PATENT DOCUMENTS

| | | | |
|---|---|---|---|
| 5,382,899 A | 1/1995 | Funatsu et al. | |
| 7,467,382 B2* | 12/2008 | Watanabe | 718/100 |
| 8,074,072 B2* | 12/2011 | Brown et al. | 713/169 |
| 2003/0027583 A1* | 2/2003 | Yugami | 455/456 |
| 2004/0106415 A1* | 6/2004 | Maeda et al. | 455/456.1 |
| 2007/0239627 A1 | 10/2007 | Yui et al. | |
| 2008/0132252 A1* | 6/2008 | Altman et al. | 455/457 |
| 2008/0182589 A1 | 7/2008 | Buccieri | |
| 2008/0232586 A1* | 9/2008 | Takada et al. | 380/255 |
| 2010/0159957 A1 | 6/2010 | Dando et al. | |

FOREIGN PATENT DOCUMENTS

| | | |
|---|---|---|
| CN | 1952680 | 4/2007 |
| KR | 1020070037161 | 4/2007 |
| KR | 1020080057222 | 6/2008 |
| WO | WO 03/065672 | 8/2003 |

* cited by examiner

*Primary Examiner* — Kent Chang
*Assistant Examiner* — Ngan Pham Lu
(74) *Attorney, Agent, or Firm* — The Farrell Law Firm, P.C.

(57) ABSTRACT

A method for providing position information and identifying positions of others, using an electronic apparatus, includes detecting first position information regarding a current position of the electronic apparatus, transmitting a position inquiry request and information regarding a predetermined time period to an external apparatus, receiving second position information regarding a position of the external apparatus from the external apparatus for the predetermined time period, and displaying positions of the electronic apparatus and the external apparatus on a screen using the first position information and the second position information.

11 Claims, 9 Drawing Sheets

METHOD FOR PROVIDING POSITION INFORMATION USING TIME PERIOD

PRIORITY

This application claims priority under 35 U.S.C. §119(a) to Korean Patent Application No. 2009-0109491, filed in the Korean Intellectual Property Office on Nov. 13, 2009, the entire content of which is incorporated herein by reference.

BACKGROUND OF THE INVENTION

1. Field of the Invention

The present invention relates generally to a method for providing position information, and more particularly, to a method for providing position information to identify position information of a counterpart apparatus using the Global Positioning System (GPS) and wireless communication.

2. Description of the Related Art

Recently, as the crime rate increases, a lot of parents often wish to know their children's whereabouts. Therefore, a service showing the current position of a user has been developed. Furthermore, because everyone carries a mobile phone these days, mobile communication technology has enabled a service, which allows a user to query the position using a mobile phone.

In addition, GPS is mounted on many apparatuses produced in recent years. GPS is a global navigation satellite system that provides reliable position anywhere in the world, whether on an airplane, a ship, or a car, using a satellite. Numerous GPS enabled mobile phones have also been released.

As such, a mobile phone with GPS is capable of detecting its current position. Therefore, a method for querying the current position of other users using a mobile phone is required.

SUMMARY OF THE INVENTION

The present invention relates to a method for providing position information, which detects first position information, that is, information regarding the current position, transmits a position inquiry request and information regarding a predetermined time period to an external apparatus, receives second position information, that is, information regarding the position of an external apparatus from the external apparatus for a predetermined period of time, and displays the positions of an electronic apparatus and an external apparatus on a screen using the first position information and the second position information.

According to one embodiment, a method for providing position information of an electronic apparatus which is communicably connected to an external apparatus includes detecting first position information regarding the current position of the electronic apparatus, transmitting a position inquiry request and information regarding a predetermined time period to the external apparatus, receiving second position information regarding the position of the external apparatus from the external apparatus for the predetermined time period, and displaying positions of the electronic apparatus and the external apparatus on a screen using the first position information and the second position information.

The method according to an embodiment may additionally include calculating distance information between the electronic apparatus and the external apparatus using the first position information and the second position information, and the displaying may include further displaying the calculated distance information on a screen.

The method according to an embodiment may additionally include encrypting the information regarding a predetermined time period using a PIN or a HASH code.

The method according to an embodiment may additionally include decrypting the received second position information using the PIN or the HASH code, and the displaying may include displaying positions of the electronic apparatus and the external apparatus on a screen using the first position information and the decrypted second position information.

According to another embodiment of the present invention a method for providing position information of an electronic apparatus which is communicably connected to an external apparatus includes receiving a position inquiry request and information regarding a predetermined time period from the external apparatus and detecting position information regarding the current position of the electronic apparatus and transmitting the detected position information to the external apparatus for the predetermined time period in response to the received position inquiry request.

According to the embodiment, information regarding a predetermined time period may be received in an encrypted state.

According to an embodiment, the method may additionally include decrypting the information regarding a predetermined time period using the PIN or the HASH code and encrypting the position information using the PIN or the HASH code. Transmitting the position information may include transmitting the encrypted position information to the external apparatus.

According to another embodiment of the present invention, a method for providing position information of the position information providing system including an electronic apparatus which is communicably connected to an external apparatus includes detecting first position information regarding the current position of the electronic apparatus by the electronic apparatus, transmitting a position inquiry request and information regarding a predetermined time period to the external apparatus by the electronic apparatus, detecting second position information regarding the position of the external apparatus and transmitting the detected first position information to the external apparatus for the predetermined time period by the electronic apparatus in response to the received position inquiry request, and displaying positions of the electronic apparatus and the external apparatus on a screen using the first position information and the second position information by the electronic apparatus. The method according to the embodiment may additionally include calculating distance information between the electronic apparatus and the external apparatus using the first position information and the second position information by the electronic apparatus, and the displaying may include further displaying the calculated distance information on a screen.

The method according to the embodiment may additionally include encrypting the information regarding a predetermined time period using a PIN or a HASH code by the electronic apparatus and encrypting the second position information using the PIN or the HASH code by the external apparatus. The external apparatus may transmit encrypted second position information to the electronic apparatus.

The method may further include decrypting the received second position information using the PIN or the HASH code and the displaying may include displaying positions of the electronic apparatus and the external apparatus on a screen using the first position information and the decrypted second position information.

According to yet another embodiment of the present invention, a method for providing position information of an electronic apparatus which is communicably connected to an external apparatus includes detecting first position information regarding the current position of the electronic apparatus, transmitting a position inquiry request to the external apparatus, receiving second position information regarding the position of the external apparatus from the external apparatus for the predetermined time period set by the external apparatus, and displaying positions of the electronic apparatus and the external apparatus on a screen using the first position information and the second position information.

Accordingly, a user may easily identify positions of other users easily using the electronic apparatus. In addition, user privacy is protected, as position information is transmitted/received in an encrypted state for a predetermined period of time.

BRIEF DESCRIPTION OF THE DRAWINGS

The above and/or other aspects of the present disclosure will be more apparent by describing certain present disclosure with reference to the accompanying drawings, in which.

DETAILED DESCRIPTION OF EMBODIMENTS OF THE PRESENT INVENTION

Certain embodiments are described in higher detail below with reference to the accompanying drawings. In the following description, like drawing reference numerals are used for the like elements, even in different drawings. The matters defined in the description, such as detailed construction and elements, are provided to assist in a comprehensive understanding of embodiments. However, embodiments can be practiced without those specifically defined matters. Also, well-known functions or constructions are not described in detail since they would obscure the application with unnecessary detail.

Figure 1:
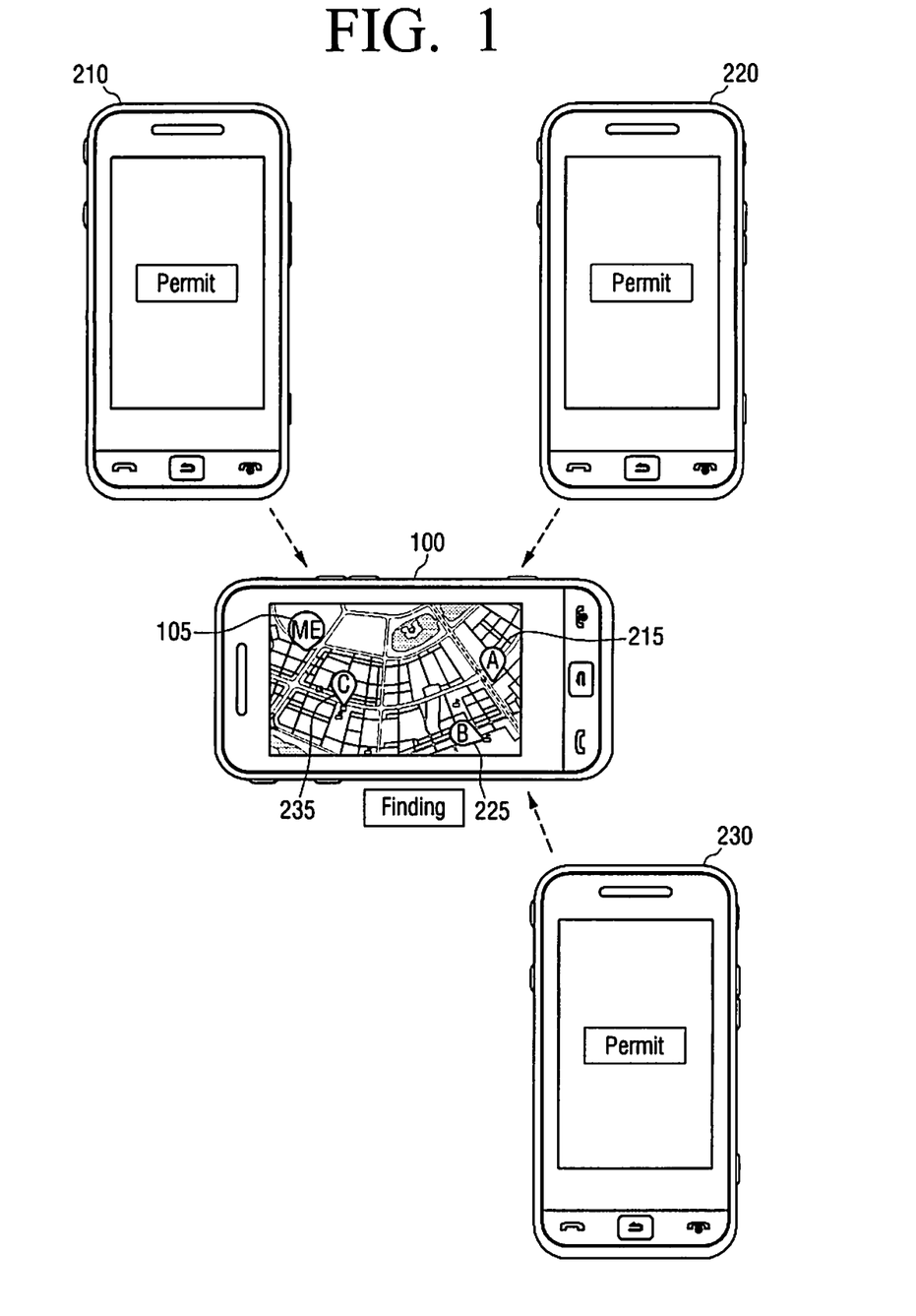
FIG. 1 is a diagram illustrating that positions of a second mobile phone, a third mobile phone and a fourth mobile phone are displayed on a screen of a first mobile phone according to an embodiment.

FIG. 1 is a diagram illustrating that positions of a second mobile phone 210, a third mobile phone 220 and a fourth mobile phone 230 are displayed on a screen of a first mobile phone 100 according to an embodiment. As illustrated in FIG. 1, the positions of the second mobile phone 210, the third mobile phone 220, and the fourth mobile phone 230 are displayed on a map of a screen of the first mobile phone 100. That is, a first mobile phone icon 105, a second mobile phone icon 215, a third mobile phone icon 225, and a fourth mobile phone icon 235 are displayed on the screen of the first mobile phone 100.

The second mobile phone 210, the third mobile phone 220, and the fourth mobile phone 230 transmit their own position information to the first mobile phone 100 via a data communication network. The data communication network may be a mobile communication network or an Internet network.

As such, the first mobile phone 100 receives position information from the second mobile phone 210, the third mobile phone 220 and the fourth mobile phone 230. In addition, the first mobile phone 100 displays the second mobile phone icon 215, the third mobile phone icon 225, and the fourth mobile phone icon 235 on corresponding positions on a map of a screen using received position information.

Accordingly, a user of the first mobile phone 100 may easily identify positions of other mobile phone users.

Figure 2:
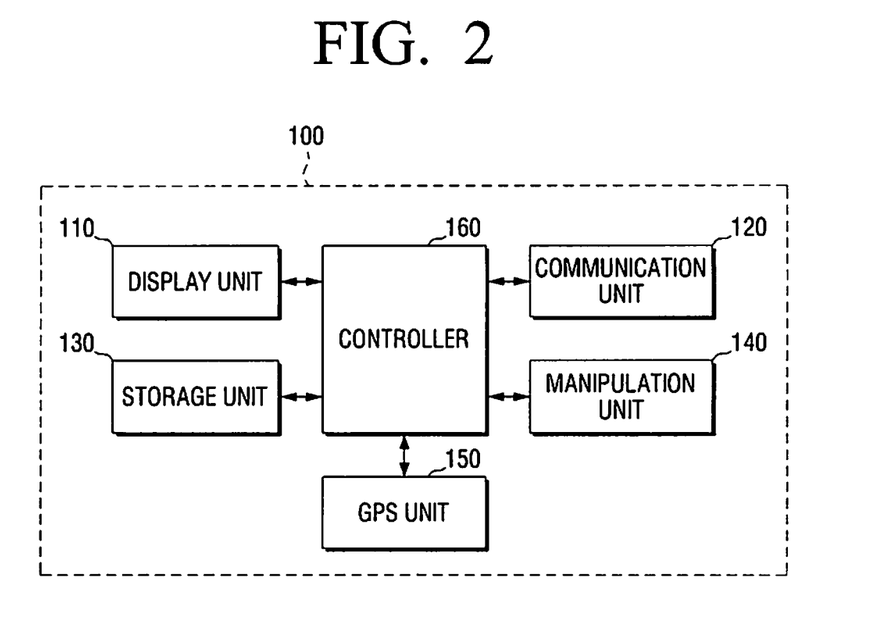
FIG. 2 is a block diagram illustrating a structure of the first mobile phone according to an embodiment.

FIG. 2 is a block diagram illustrating a structure of the first mobile phone 100 according to an embodiment. As illustrated in FIG. 2, the first mobile phone 100 comprises a display unit 110, a communication unit 120, a storage unit 130, an input unit 140, a GPS unit 150, and a controller 160.

The display unit 110 displays an image for providing function of the first mobile phone 100. The display unit 110 displays Graphic User Interfaces (GUIs) on the screen. In addition, the display unit 110 may display icons indicating positions of other mobile phones on a map of the screen.

The communication unit 120 is communicably connected to other mobile phones via a mobile communication network or an Internet network. Herein, the mobile communication network may be Global System for Mobile communications (GSM) network or Wideband Code Division Multiple Access (WCDMA) communication network. The communication unit 120 is connected to the mobile communication network via a base station, and the communication unit 120 is connected to the Internet network via a wireless Access Point (AP).

The communication unit 120 transmits a position inquiry request and information regarding a predetermined time period to an external apparatus. Herein, the position inquiry request is a request to receive the second position information, that is, information regarding the current position of an external apparatus from the external apparatus. The information regarding a predetermined time period is information regarding a predetermined time interval corresponding to a time period for receiving position information from an external apparatus.

In addition, the communication unit 120 receives the second position information from the external apparatus for a time period corresponding to a predetermined time period. For example, if a predetermined time period is from 10:00 to 12:00 am, the communication unit 120 receives the second position information from the external apparatus from 10:00 to 12:00 am. If a predetermined time period is for two hours, the communication unit 120 receives the second position information from the external apparatus for two hours from a present time.

The storage unit 130 stores programs to perform various functions of the first mobile phone 100. In addition, the storage unit 130 stores position information received from an external apparatus. The storage unit 130 may be embodied as a hard disk, or a non-volatile memory.

The input unit 140 receives user input and transmits the user input to the controller 160. Specifically, the input unit 140 receives a position inquiry command from a user to start inquiry for the position of an external apparatus. The input unit 140 may be embodied as a button formed on the first mobile phone 100 or a touch screen.

The GPS unit 150 detects the first position information, that is, information regarding the current position of the first mobile phone 100. The GPS unit 150 detects position information in the form of a GPS coordinate including latitude and longitude. In addition, the GPS unit 150 transmits the detected first position information to the controller 160.

The controller 160 controls overall operation of the first mobile phone 100. Specifically, the controller 160 detects the first position information, that is, the current position of the first mobile phone 100 using the GPS unit 150. In addition, the controller 160 may detect the current position using a mobile communication base station or a wireless AP which are connected through the communication unit 120. To do so, the controller 160 detects the current position periodically. For example, the controller 160 may control to detect a coordinate of the current position by operating the GPS unit 150 once every five minutes.

Specifically, if the first mobile phone 100 is in an area where a GPS signal can be received (for example, outdoors), the controller 160 detects the first position information using the GPS unit 150. However, if the first mobile phone 100 is in an area where a GPS signal cannot be received (for example, indoors), the controller 160 detects the first position information of the first mobile phone 100 using information regarding the position of a mobile communication base station or a wireless AP which are connected through the communication unit 120.

In addition, the controller 160 controls to transmit a position inquiry request and information regarding a predetermined time period to an external apparatus. Specifically, if a position inquiry command is input through user input, the controller 160 controls to transmit a position inquiry request and information regarding a predetermined time period to an external apparatus.

In this case, the information regarding a predetermined time period is information regarding a predetermined time interval corresponding to a time period for receiving position information from an external apparatus. The information regarding a predetermined time period may be set by a user or may be pre-set.

The controller 160 encrypts information regarding a predetermined time period and transmits the encrypted information. Specifically, the controller 160 encrypts information regarding a predetermined period of time using a Personal Identification Number (PIN) or a HASH code.

In addition, the controller 160 controls to receive the second position information, that is, information regarding the position of an external apparatus, from the external apparatus, for a predetermined period of time. For example, if a predetermined time period is from 10:00 to 12:00 am, the controller 160 controls the communication unit 120 to receive the second position information from the external apparatus from 10:00 to 12:00 am. If a predetermined time period is two hours, the controller 160 controls the communication unit 120 to receive the second position information from the external apparatus for two hours from a present time.

In this case, the received second position information may be encrypted using a PIN or a HASH code. Herein, the PIN or the HASH code is the PIN or the HASH code which is used by the controller 160 to encrypt a predetermined time period. Accordingly, the controller 160 decrypts a code of the received second position information by using the PIN or the HASH code used for encrypting a predetermined time period.

Specifically, examples of the PIN and the HASH code are as follows. Suppose that a predetermined time period is a total of two hours, that is, from Sep. 13, 2009, 12:00 to Sep. 13, 2009, 14:00. In this case, a PIN may be "2009091312000200" if the PIN includes information regarding a start time and a time period of the predetermined time period. Alternatively, the PIN may be "20090913120020090913 1400" if the PIN includes information regarding a start time and an end time of the predetermined time period. If a predetermined period of time is from 8:00 am to 5:00 pm of Monday to Friday, the PIN may be "08001700MON2FRI." Alternatively, if a predetermined period of time is from 8:00 am to 5:00 pm on Monday, the PIN may be "08001700MON."

The HASH code is a code value which can be obtained by applying a PIN to a HASH function. Specifically, the HASH code of PIN "2009091312000200" is "DF28YTF" and the HASH code of PIN "20090913120020090913 1400" is "57DDTFS." In addition, the HASH code of PIN "08001700MON2FRI" is "O18237FS" and the HASH code of PIN "08001700MON" is "ZF102FFS."

The controller 160 controls to display the first mobile phone 100 and the position of an external apparatus on a screen using the detected first position information and the decrypted second position information. Specifically, the controller 160 displays a map on the screen, and controls to display icons corresponding to each of the first mobile phone 100 and the position of the external apparatus on the map.

In addition, the controller 160 may calculate distance information between the first mobile phone 100 and an external apparatus using the first position information and the second position information. The controller may also display the calculated distance information on the screen. Specifically, the controller 160 may control to display calculated distance information between an icon of the first mobile phone 100 and an icon of an external apparatus.

If a user selects an icon of an external apparatus displayed on the screen, the controller 160 may control to display a menu for performing functions of the external apparatus on the screen. For example, if a user selects an icon of an external apparatus displayed on the screen, the controller 160 may control to display a menu including an item for making a telephone call to the external apparatus and an item for sending a text message to the external apparatus.

The first mobile phone 100 having the above configuration may display the position of an external apparatus on a screen. Since the first mobile phone 100 receives and displays the position of an external apparatus only for a predetermined period of time and receives/transmits the position of the external apparatus in an encrypted state, user privacy is protected.

FIG. 2 describes configuration of only the first mobile phone 100, but the second mobile phone 210, the third mobile phone 220, and the fourth mobile phone 230 which are external apparatuses also have configuration similar to configuration illustrated in FIG. 2. Although the second mobile phone 210, the third mobile phone 220 and the fourth mobile phone 230 perform functions as an external apparatus, there are some differences in functions of each mobile phone. Those different functions of each mobile phone will be explained below by referring to the second mobile phone 210.

The second mobile phone 210 has the same configuration as the first mobile phone 100 in FIG. 2 and serves as an external apparatus. However, there are some differences in functions of a controller between the first mobile phone 210 and the first mobile phone.

Specifically, the controller of the second mobile phone 210 receives a position inquiry request and information regarding a predetermined time period from the first mobile phone 100. In this case, the information regarding a predetermined time period received from the first mobile phone 100 is received in an encrypted state by using a PIN or a HASH code. Accordingly, the controller of the second mobile phone 210 decrypts the received information regarding a predetermined time period using the received PIN or HASH code and uses the decrypted information.

In addition, the controller of the second mobile phone 210 detects second position information regarding the current position of the second mobile phone 210 and transmits the detected position information to the first mobile phone 100 for a predetermined time period in response to the received position inquiry request. In this case, the controller of the second mobile phone 210 encrypts the second position information using a PIN or a HASH code received from the first mobile phone 100 and transmits the encrypted second position information to the first mobile phone 100.

As such, the controller of the second mobile phone 210 encrypts information regarding the second position information and provides the encrypted position information to the first mobile phone 100. The controllers of the third mobile phone 220 and the fourth mobile phone 230 perform functions similar to the controller of the second mobile phone 210.

Figure 3:
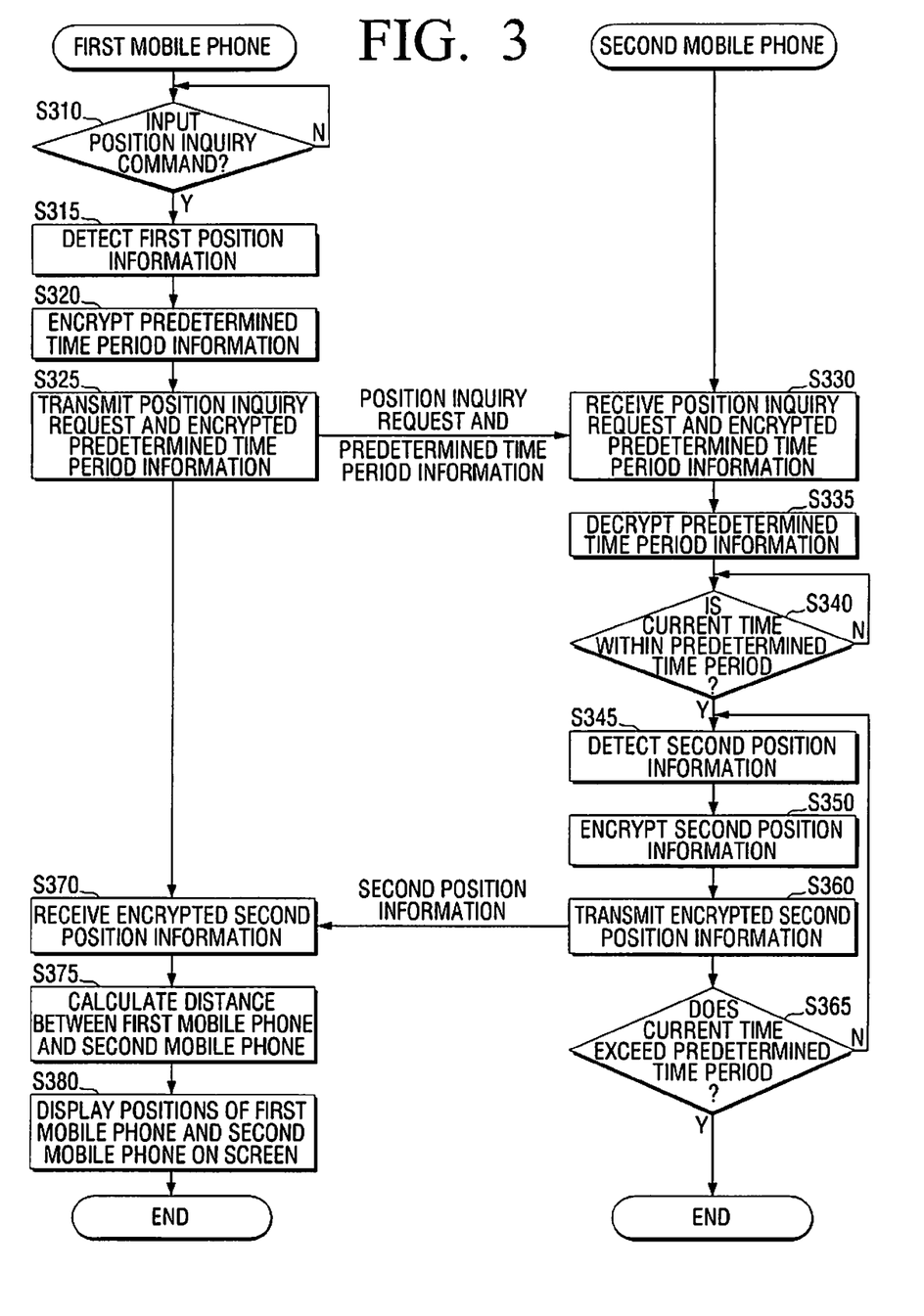
FIG. 3 is a flowchart to explain a method for providing position information of the first mobile phone and the second mobile phone according to an embodiment.

Hereinafter, a method for providing position information will be described in detail with reference to FIG. 3. FIG. 3 is a flowchart to explain a method for providing position information of the first mobile phone 100 and the second mobile phone 210 according to an embodiment.

First, the first mobile phone 100 determines whether a position inquiry command is input in step S310. If the position inquiry command is input (S310-Y), the first mobile phone 100 detects first position information regarding the current position of the first mobile phone 100 in step S315.

Specifically, if the first mobile phone 100 is in an area where a GPS signal can be received (for example, outdoors), the first mobile phone 100 detects the first position information using the GPS unit 150. However, if the first mobile phone 100 is in an area where a GPS signal cannot be received (for example, indoors), the first mobile phone 100 detects the first position information of the first mobile phone 100 using information regarding the position of a mobile communication base station or a wireless AP which are connected through the communication unit 120.

Subsequently, the first mobile phone 100 encrypts information regarding a predetermined time period in step S320. Specifically, the first mobile phone 100 encrypts information regarding a predetermined time period using a PIN or a HASH code.

In this case, the information regarding a predetermined time period is information regarding a predetermined time interval corresponding to a time period for receiving position information from an external apparatus. The information regarding a predetermined time period may be set by a user or may be pre-set.

Subsequently, the first mobile phone 100 transmits a position inquiry request and the encrypted information regarding a predetermined time period to the second mobile phone 200 in step S325.

The second mobile phone 210 receives the position inquiry request and the encrypted information regarding a predetermined time period from the first mobile phone in step S330. In this case, the information regarding a predetermined time period received from the first mobile phone 100 is received in an encrypted state by using a PIN or a HASH code. Accordingly, the second mobile phone 210 decrypts the received information regarding a predetermined time period using the received PIN or HASH code in step S335.

Subsequently, the second mobile phone 210 determines whether the current time enters in a scope of the predetermined time period in step S340. If the current time does not enter in the scope of the predetermined time period (S340-N), the second mobile phone 210 is on standby until the current time enters in the predetermined time period.

If the current time enters in the predetermined time period (5340-Y), the second mobile phone 210 detects second position information regarding the current position of the second mobile phone 210 in step S345. Specifically, if the second mobile phone is in an area where a GPS signal can be received (for example, outdoors), the second mobile phone 210 detects second position information using a GPS. However, if the second mobile phone 210 is in an area where a GPS signal cannot be received (for example, indoors), the second mobile phone 210 detects the second position information of the second mobile phone 210 using information regarding the position of a mobile communication base station or a wireless AP which are connected through the communication unit.

Subsequently, the second mobile phone 210 encrypts the second position information using a PIN or a HASH code received from the first mobile phone 100 in step S350. The second mobile phone 210 transmits the encrypted second position information to the first mobile phone 100 in step S360.

Subsequently, the second mobile phone 210 determines whether the current time passes a predetermined time period in step S365. If the current time passes the predetermined time period (S365-Y), the second mobile phone 210 terminates the operation of transmitting the second position information.

On the other hand, if the current time does not pass the predetermined time period (S365-N), the second mobile phone 210 repeats operations in S345 to S360. Accordingly, the second mobile phone 210 detects second position information regarding the current position of the second mobile phone 210 and transmits the detected position information to the first mobile phone 100 for a predetermined time period in response to a position inquiry request received from the first mobile phone 100.

Subsequently, the first mobile phone 100 receives the second position information from the second mobile phone 210 for the predetermined time period in step S370. For example, if the predetermined time period is from 10:00 to 12:00 am, the first mobile phone 100 receives the second position information from an external apparatus from 10:00 to 12:00 am. If the predetermined time period is for two hours, the first mobile phone 100 receives the second position information from the external apparatus for two hours from a present time.

In this case, the received second position information is received in an encrypted state by using a PIN or a HASH code. Herein, the PIN or the HASH code is the PIN or the HASH code which is used by the first mobile phone 100 to encrypt a predetermined time period. Accordingly, the first mobile phone 100 decrypts the received second position information using the PIN or HASH code which is used for encrypting the predetermined time period.

In addition, the first mobile phone 100 calculates distance information between the first mobile phone 100 and the second mobile phone 210 using the first position information and the second position information in step S375. The first mobile phone 100 also displays positions of the first mobile phone 100 and the second mobile phone 210 on a screen using the detected first position information and the decrypted second position information in step S380.

Specifically, the first mobile phone 100 displays a map on the screen, and displays icons corresponding to each of the first mobile phone 100 and the second mobile phone 210 on the map. In addition, the first mobile phone 100 may also display calculated distance information on the screen. Specifically, the first mobile phone 100 may display calculated distance information between an icon of the first mobile phone 100 and an icon of the second mobile phone 210.

In addition, if a user selects an icon of the second mobile phone 210 displayed on the screen, the first mobile phone 100 may display a menu for performing functions of the second mobile phone 210 on the screen. For example, if a user selects an icon of the second mobile phone 210 displayed on the screen, the controller 160 may display a menu including an item for making a telephone call and an item for sending a text message to the second mobile phone 210.

As such, the first mobile phone 100 may display the position of the second mobile phone 210 on a screen. Since the first mobile phone 100 receives and displays the position of the second mobile phone 210 only for a predetermined period of time and receives/transmits the position information in an encrypted state, user privacy is protected.

Hereinafter, a process of displaying position information in the first mobile phone 100 will be explained in detail with reference to FIGS. 4A to 4F. FIGS. 4A to 4F are diagrams illustrating a process of displaying position information on the first mobile phone 100 according to an embodiment.

Figure 4A:
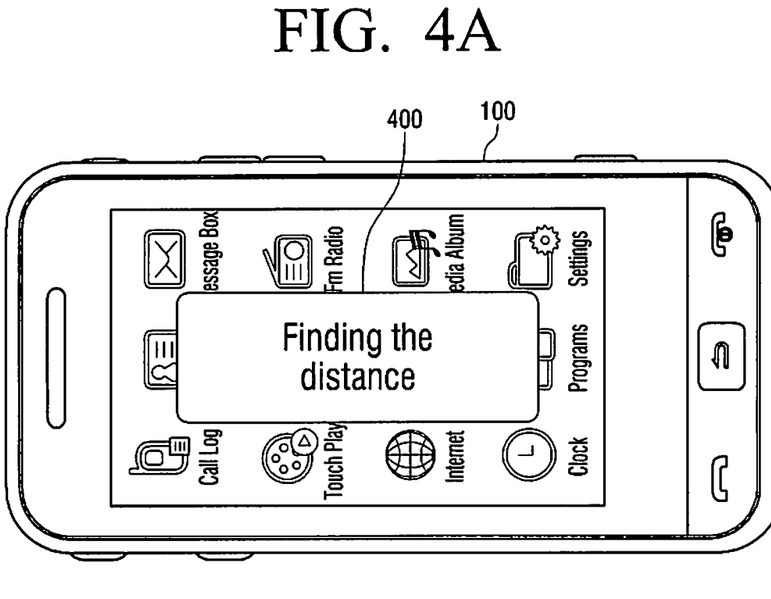
FIGS. 4A to 4F are diagrams illustrating a process of displaying position information on the first mobile phone according to an exemplary embodiment.

FIG. 4A illustrates a screen where a user selects a position inquiry icon 400. As illustrated in FIG. 4A, if the user touches the position inquiry icon 400, the first mobile phone 100 receives a position inquiry command.

Figure 4B:
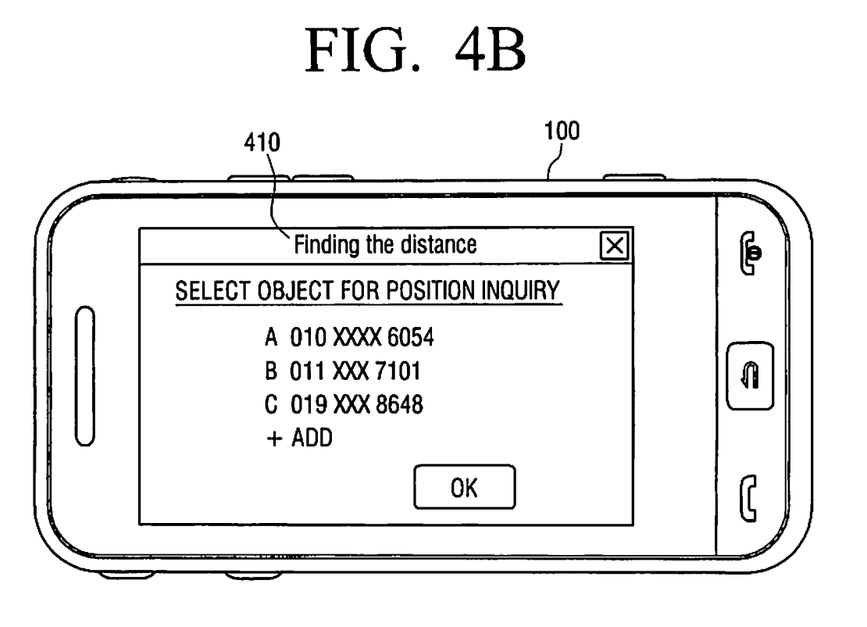

Subsequently, the first mobile phone 100 displays a menu 410 for selecting an object for position inquiry on a screen. As illustrated in FIG. 4B, a user of the first mobile phone 100 selects user A, user B, and user C for position inquiry. Herein, it can be assumed that the mobile phone of user A is the second mobile phone 210 in FIG. 1, the mobile phone of user B is the third mobile phone 220 in FIG. 1, and the mobile phone of user C is the fourth mobile phone 230 in FIG. 1.

Figure 4C:
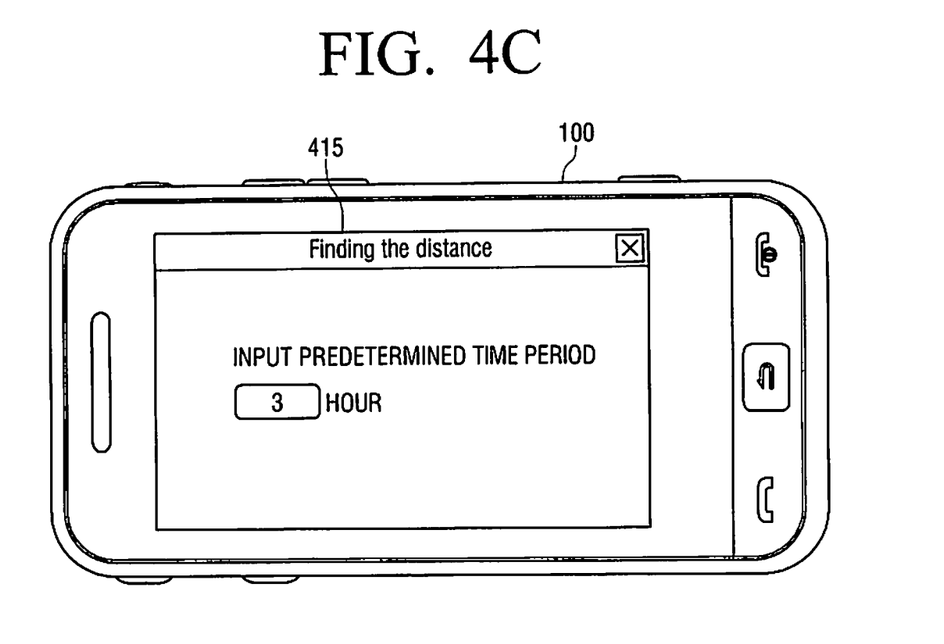

FIG. 4C illustrates a screen on which an input window 415 for inputting a predetermined time period in the first mobile phone 100 is displayed. As illustrated in FIG. 4C, if a user inputs three hours of a predetermined time period, the first mobile phone 100 receives position information from other mobile phones for three hours from a present time.

In FIG. 4C, only one time period is input as a predetermined time period, but this is only an example. That is, a predetermined time period may be input in various ways including a predetermined time interval. Specifically, if a predetermined time period is from 10:00 to 12:00 am, the first mobile phone 100 receives second position information from other mobile phones from 10:00 to 12:00 am.

As such, if an object for position inquiry is selected and a predetermined time period is input in the first mobile phone 100, the first mobile phone 100 transmits a position inquiry request and the predetermined time period to each mobile phone of the users which are subject to position inquiry.

Figure 4D:
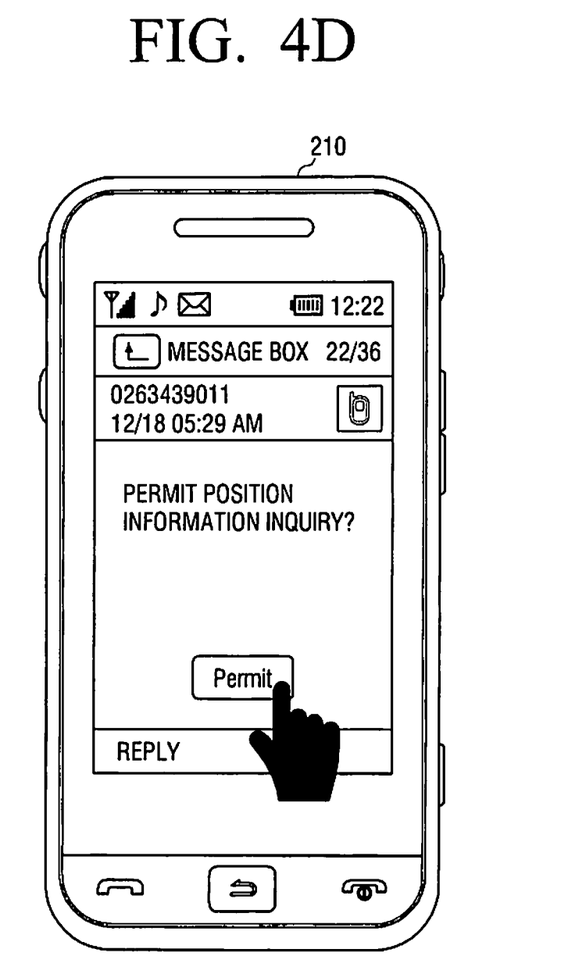

Subsequently, a message 420 for confirming whether to permit position inquiry is displayed on the mobile phones of the users which are subject to position inquiry as illustrated in FIG. 4D. FIG. 4D illustrates a screen where the message 420 for confirming whether to permit position inquiry is displayed on the screen of the second mobile phone 210 which is the mobile phone of user A. As illustrated in FIG. 4D, if a user selects a permission button, the second mobile phone 210 transmits second position information regarding the current position of the second mobile phone 210 to the first mobile phone 100.

In addition, the third mobile phone 220 which is a mobile phone of user B and the fourth mobile phone 230 which is a mobile phone of user C also transmit its own position information to the first mobile phone 100.

Figure 4E:
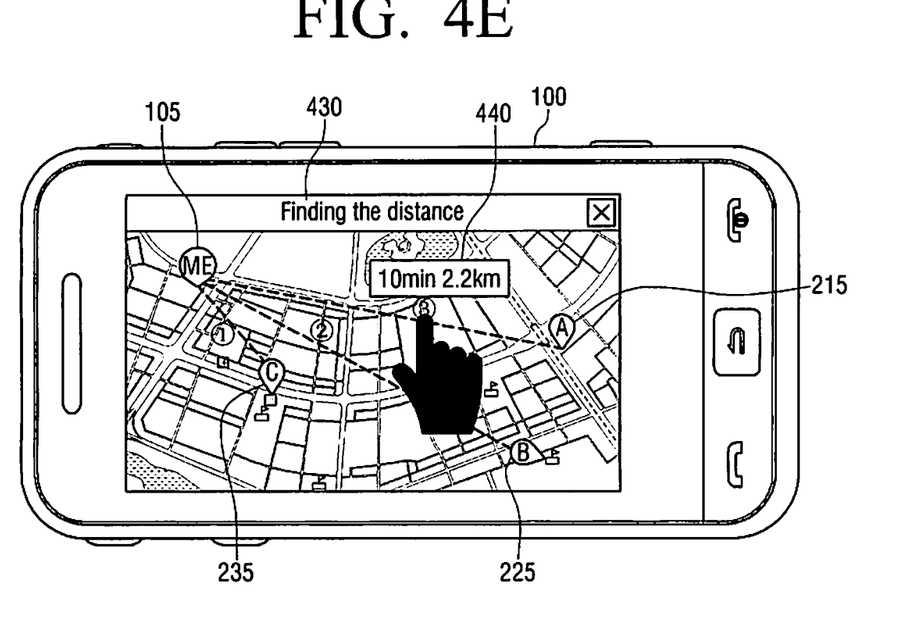

FIG. 4E illustrates a position inquiry screen 430 where positions of users who are subject to position inquiry are displayed on a map. As illustrated in FIG. 4E, the first mobile phone 100 displays positions of a user of the first mobile phone 100, user A, user B, and user C on the map in the form of icons. As illustrated in FIG. 4E, the first icon 105 represents the position of a user of the first mobile phone, the second icon 215 represents the position of user A who is a user of the second mobile phone, the third icon 225 represents the position of user B who is a user of the third mobile phone, and the fourth icon 235 represents the position of user C who is a user of the fourth mobile phone.

In addition, as illustrated in FIG. 4E, if a user selects a portion between the first icon 105 and the second icon 215, the first mobile phone 100 displays a distance icon 440 on a screen. As illustrated in FIG. 4E, the distance icon 440 displays information regarding distance and time between the two users.

As such, the first mobile phone 100 displays positions of users on the position inquiry screen 430 in the form of icons, and displays the distance icon 440 for displaying distance between users according to user input.

Figure 4F:
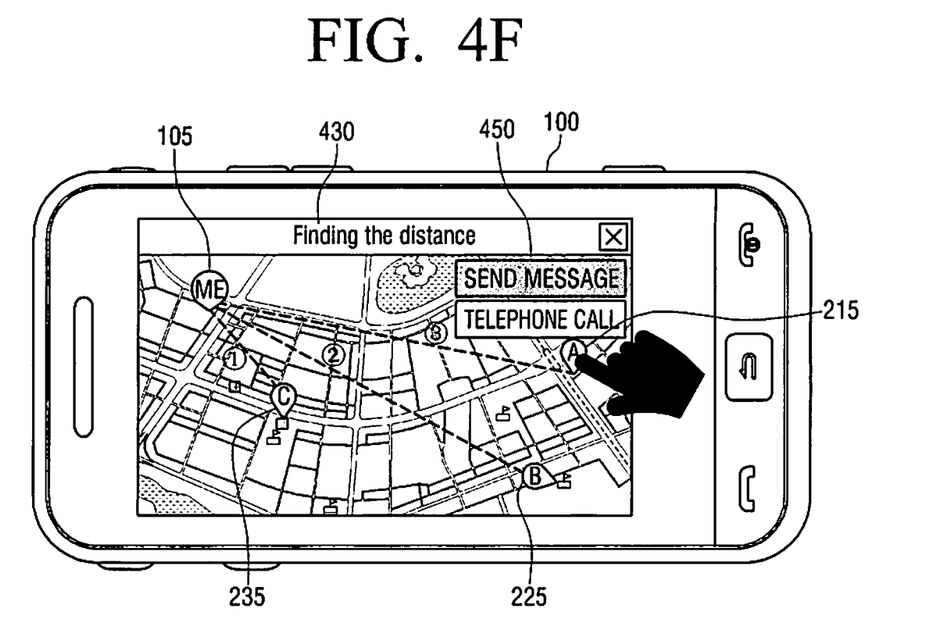

FIG. 4F illustrates a screen where a function menu 450 corresponding to an icon selected by a user is displayed. As illustrated in FIG. 4F, if a user selects the first icon 215, the first mobile phone 100 displays the function menu 450 for performing a function of a mobile phone of user A corresponding to the first icon 215. As illustrated in FIG. 4F, the function menu 450 includes an item of sending a message and an item of making a telephone call. The first icon 215 corresponds to the second mobile phone 210 which is a mobile phone of user A. Accordingly, if the item of sending a message is selected, the first mobile phone 100 executes a window for sending a message to the second mobile phone 210. If the item of making a telephone call is selected, the first mobile phone 100 performs the function of making a telephone call to the second mobile phone 210. As such, if one of the icons of objects for position inquiry displayed on the position inquiry screen 430 is selected by a user, the first mobile phone 100 displays the function menu 450 for performing a function of a mobile phone of a user corresponding to the selected icon.

Through the above processes, the first mobile phone 100 may make inquiries for positions of other mobile phones and perform functions of other users who are subject to position inquiry with ease. Accordingly, a user may easily make inquires for the position of a desired person easily using a mobile phone.

In the present embodiment, a predetermined time period is set by the first mobile phone 100, but this is only an example. The predetermined time period may be set by a mobile phone which is subject to position inquiry (that is, the second mobile phone 210 to the fourth mobile phone 230). In this case, if the second mobile phone 210 receives a position inquiry request from the first mobile phone 100, the second mobile phone 210 receives information regarding a predetermined time period from a user.

Accordingly, if the first mobile phone 100 transmits a position inquiry request to the second mobile phone 210, second position information regarding the position of the second mobile phone 210 is received from the second mobile phone 210 for a predetermined time period set by the second mobile phone 210.

In the present embodiment, an electronic apparatus and an external apparatus are assumed to be a mobile phone, but this is only an example. That is, the electronic apparatus and the external apparatus may be any apparatus which is capable of detecting the current position and transmitting/receiving position information. For example, the electronic apparatus and the external apparatus may be television, MP3, PMP, PDA, notebook computer, navigator, and computer which are capable of detecting a position and transmitting/receiving data.

Although a few embodiments of the present invention have been shown and described, it would be appreciated by those skilled in the art that changes may be made in these embodiment without departing from the principles and spirit of the invention, the scope of which is defined in the appended claims and their equivalents.

What is claimed is:

1. A method for providing position information of an electronic apparatus which is communicably connected to an external apparatus, the method comprising:
   detecting first position information regarding a current position of the electronic apparatus;
   receiving a user input which sets a predetermined time period during which a position of the external apparatus can be transmitted by the external apparatus;
   transmitting a position inquiry request including encrypted information regarding the predetermined time period based on the user input to the external apparatus;
   receiving second position information related to the position of the external apparatus during the predetermined time period from the external apparatus in response to the position inquiry request, the second position information being received in an encrypted state using a Personal Identification Number (PIN) or a HASH code;
   decrypting the received second position information using the PIN or the HASH code; and
   displaying a position indicator for indicating the position of the external apparatus on a screen of the electronic apparatus based on the first position information and the second position information,
   wherein displaying the position indicator on the screen comprises displaying positions using the first position information and the decrypted second position information.

2. The method as claimed in claim 1, further comprising:
   encrypting the information regarding the predetermined time period using a Personal Identification Number (PIN) or a HASH code.

3. The method as claimed in claim 1,
   wherein the displaying further comprises displaying a position indicator which indicates the positions of the electronic apparatus on a screen using the first position information.

4. The method as claimed in claim 1, wherein the position indicator is at least one of an icon, a spot, a text and a picture.

5. A method for providing position information of an electronic mobile apparatus which is communicably connected to an external mobile apparatus, the method comprising:
   receiving a position inquiry request including encrypted information regarding a predetermined time period during which a current position of the electronic mobile apparatus can be transmitted to the external apparatus, the external mobile apparatus being operable to set the predetermined time period;
   decrypting the information regarding the predetermined time period using a Personal Identification Number (PIN) or a HASH code;
   detecting, by using a Global Positioning System (GPS) unit, position information regarding the current position of the electronic mobile apparatus;
   encrypting the detected position information using the PIN or the HASH code, and if a current time is within the predetermined time period, transmitting the encrypted position information to the external mobile apparatus in response to the received position inquiry request.

6. The method as claimed in claim 5, further comprising:
   encrypting the information regarding the predetermined time period using the PIN or the HASH code.

7. An electronic apparatus which is communicably connected to an external apparatus, the electronic apparatus comprising:
   a Global Positioning System (GPS) unit which detects first position information regarding a current position;
   an input unit which receives a user input that sets a predetermined time period during which a position of the external apparatus can be transmitted by the external apparatus;
   a communication unit which transmits a position inquiry request including encrypted information regarding a predetermined time period based on the user input to the external apparatus, and receives second position information related to the position of the external apparatus during the predetermined time period from the external apparatus in response to the position inquiry request, the second position information being encrypted using a Personal Identification Number (PIN) or a HASH code;
   a controller which decrypts the received second position information using the PIN or the HASH code; and
   a display unit which displays a position indicator that indicates the position of the external apparatus on a screen based on the first position information and the second position information,
   wherein the display unit displays the position by using the first position information and the decrypted second position information.

8. The electronic apparatus as claimed in claim 7, further comprising:
   a controller which encrypts the information regarding the predetermined time period using the PIN or the HASH code.

9. The electronic apparatus as claimed in claim 7, wherein the position indicator is at least one of an icon, a spot, a text and a picture.

10. An electronic mobile apparatus communicably connected to an external mobile apparatus, the electronic mobile apparatus comprising:
    a communication unit which receives a position inquiry request including encrypted information regarding a predetermined time period during which a current position of the electronic mobile apparatus can be transmitted to the external apparatus;
    a Global Positioning System (GPS) unit which detects position information regarding the current position of the electronic mobile apparatus; and
    a controller which decrypts the information regarding the predetermined time period using a Personal Identification Number (PIN) or a HASH code, and encrypts the detected position information using the PIN or the HASH code,
    wherein the external mobile apparatus is operable to set the predetermined time period, and if it is determined that a current time is within the predetermined time period, the communication unit transmits the encrypted position information to the external mobile apparatus in response to the received position inquiry request.

11. The electronic mobile apparatus as claimed in claim 10, further comprising:
    a controller which encrypts the information regarding the predetermined time period using the PIN or the HASH code.

* * * * *